United States Patent

[11] 3,579,836

| [72] | Inventors | Heinz Kraus;<br>Siegbert Holstein, Traunreut, Germany |
|---|---|---|
| [21] | Appl. No. | 822,935 |
| [22] | Filed | May 8, 1969 |
| [45] | Patented | May 25, 1971 |
| [73] | Assignee | Dr. Johannes Heidenhain<br>Traunstein, Germany |
| [32] | Priority | May 10, 1968 |
| [33] | | Germany |
| [31] | | P 17 73 403.1 |

[54] ARRANGEMENT FOR MEASURING OF LENGTHS
22 Claims, 4 Drawing Figs.

[52] U.S. Cl. ................................................ 33/1R, 33/125C
[51] Int. Cl. ........................................ G01b 11/02, B23q 17/02
[50] Field of Search ................................... 73/431; 33/1 (O), 125 (O), 125; 34/74 (C); 338/184 (CE); 74/566 (CE); 259/125; 222/182, 562

[56] References Cited
UNITED STATES PATENTS

| 2,471,050 | 5/1949 | Turrettini | 33/1 |
| 2,504,727 | 4/1950 | Post | 259/125 |
| 2,706,230 | 4/1955 | Bourns et al. | 338/184 |

*Primary Examiner*—Leonard Forman
*Assistant Examiner*—Gary G. Kuehl
*Attorney*—Ernest G. Montague

ABSTRACT: An arrangement for measuring of lengths, which comprises a measuring system including a measuring rod and a sensing device. The measuring system is enclosed for protection against disturbing outer influences. A covering shaft has a U-profile and receives the sensing device. Resilient sealing lips of bendable material engage the leg portions of the covering shaft over its entire length and covers as a roof member the covering shaft. A driver projects through the sealing lips and has a cross section of a sword favoring the adherence of the sealing lips.

INVENTORS
HEINZ KRAUS
SIEGBERT HOLSTEIN
BY
ATTORNEY.

ARRANGEMENT FOR MEASURING OF LENGTHS

The present invention relates to an arrangement for measuring of lengths in general, and to such arrangement or measuring system consisting of a measuring rod and a sensing device, in particular, which measuring system is enclosed for protection against disturbing outside influences.

It is one object of the present invention to provide a particularly advantageous formation of this arrangement. In particular, it has the purpose to create a possibly well-sealing closing, which, however, nevertheless, provides the least possible resistance against displacement of the sensing device relative to the measuring rod, so that falsification of the measuring results are avoided.

It is another object of the present invention to provide an arrangement for measuring of lengths which basically avoids that forces are transmitted to the measuring rod body by the covering thereof. Furthermore, the structure of the arrangement is to be as much as possible of a simple nature.

It is still another object of the present invention to provide an arrangement for measuring of lengths, wherein a rooflike covering is provided for a covering shaft surrounding the measuring system, which can be used even with extremely unfavorable outside conditions, and nevertheless can be manufactured simply and economically, as well as beyond that is easily mounted on the covering shaft for the measuring system.

With these and other objects in view, which will become apparent in the following detailed description, the present invention will be clearly understood in connection with the accompanying drawings, in which.

Figure 1:
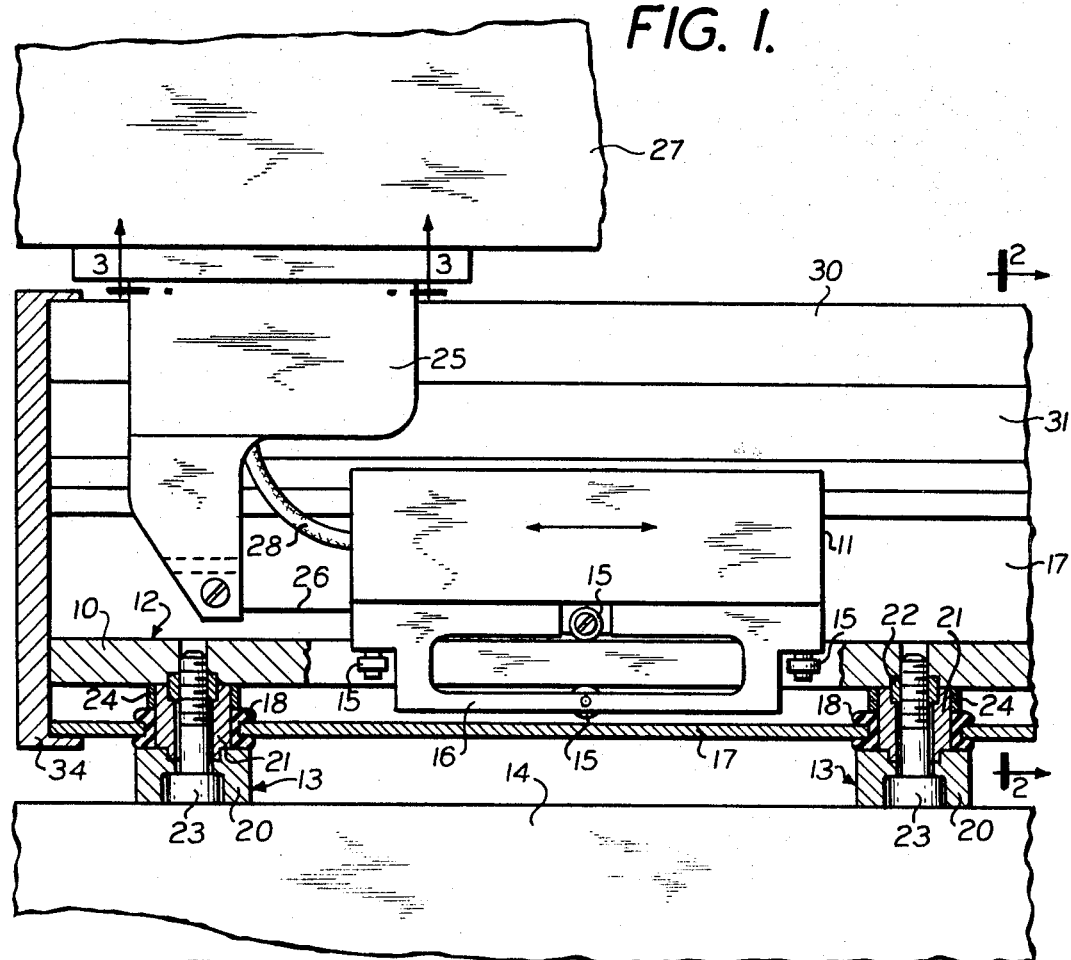
FIG. 1 is a section of the arrangement designed in accordance with the present invention for measuring of lengths.

Referring now to the drawings, and in particular to FIG. 1, the arrangement for measuring of lengths comprises, as shown in FIG. 1, a measuring rod 10, over which is prepositioned a photoelectric grid sensing device 11 of any known structure. The division or scale 12 of the prismatic-measuring rod 10 is a reflection grid with alternately light reflecting and light absorbing fields. The measuring rod 10 is secured in the drawing by a plurality of supporting legs 13, by example, on a bed 14 of a machine or the like. Guiding elements 15 provided on a slide 16, which guiding elements 15 are advantageously ball bearings, surround the measuring rod 10 such, that upon displacement of the sensing device 11 the free passage of the supporting legs 13 is permitted. The supporting legs 13 project through a U-shaped covering shaft 17 for the measuring system 10 and 11. Elastic sealing rings 18 at the passage point are supposed to bring about, that the covering shaft 17 is slightly displaceable, so that by the covering shaft 17 practically no forces can be exerted on the measuring rod 10.

The supporting legs 13 comprise the actual clamping part 20, as well as a bolt 21 centered therein. A ring 22 fitted in the measuring rod 10 as well as in the bolt 21 serves the centering of the supporting leg 13, which is secured by means of a screw 23 on the measuring rod 10. By means of a ring 24 the distance between the measuring ruler 10 and the U-shaped covering shaft 17 can be set.

Figure 3:
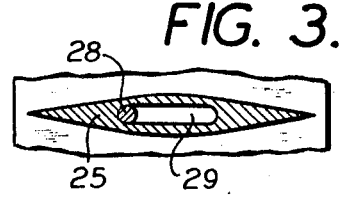
FIG. 3 is a section along the lines 3–3 of FIG. 1.

A driver 25, which is pivotally coupled with the sensing device 11 by means of a buckle safe wire member 26, connects the sensing device 11 with a displaceable part 27, for instance, a machine slide, the movement of which has to be measured. A cable 28 which is disposed in a slot 29 of the driver 25, (FIG. 3) contains in FIG. 1 the required electrical conduits for the photoelectric-sensing device 11, as well as advantageously also a fiber-optic, by which the sensing plate of the sensing device 11 is illuminated. The illumination device (not shown) is provided on the part 27 carrying the driver 35.

The U-shaped covering shaft 17 is, as shown in the drawing, covered by means of rooflike disposed sealing lips 30 and 30'.

The sealing lips 30 and 30' are mounted in an advantageous manner on the legs of the U-shaped covering shaft 17 and are made in accordance with the present invention of bendable material. The sealing lips 30 and 30' are suitably of synthetic material, preferably produced of polyurethane, which is characterized knowingly by its capability of bending, as well as good sliding characteristics and high mechanical resistance and the like.

Figure 2:
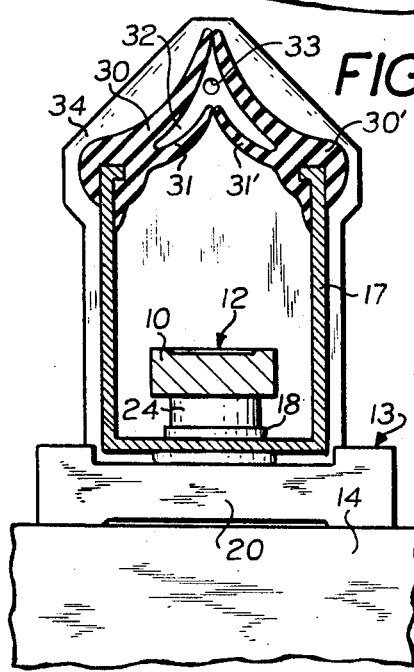
FIG. 2 is a section along the lines 2–2 of FIG. 1.

In the embodiment disclosed in FIGS. 1 and 2, the rooflike covering comprises advantageously two superposed rooflike pairs of sealing lips 30 and 30', 31 and 31', respectively, through which the driver 25 for the sensing device 11 projects. Advantageously, the space 32 defined by the two rooflike pairs of sealing lips 30 and 30', 31 and 31', respectively, and pressurized air is blown through a bore 33 of the cover 34 closing the covering shaft 17. By this arrangement, in the chamber or space 32 formed by the pairs of sealing lips 30 and 30', 31 and 31', respectively, impurities still contained in the pressurized air, for instance, water or oil drops, are extensively removed, so that the division 12 of the measuring rod 10 remains practically free from soilings of any type and a perfect sensing thereof is assured.

Figure 4:
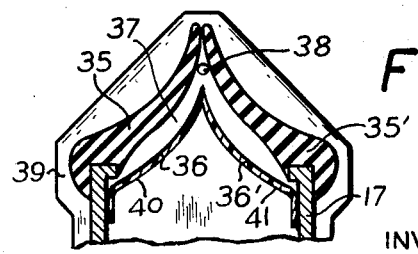
FIG. 4 is a second embodiment of the cover designed in accordance with the present invention.

In FIG. 4 the rooflike cover comprises two pairs of sealing lips 35 and 35', 36 and 36', respectively, of which the lower pair of sealing lips 36 and 36', not as shown in the embodiment disclosed in FIG. 2, is made of bendable material, rather of metallic material, preferably of resilient steel bands. A layer of synthetic material 40 and 41, respectively, (the thickness shown exaggerated in the drawing) preferably Teflon, may be provided on the face of the steel bands 36 and 36', respectively, opposite the driver, namely the inner surfaces thereof. The metallic pair of sealing lips 36 and 36' should serve jointly with the metallic covering shaft 17 also as a screening against disturbing impulses. In the space 37 defined between the pairs of sealing lips 35, 35', and 36, 36', respectively, pressurized air is fed, as shown in FIG. 2, by means of a bore 38 of the cover 39 closing the covering shaft 17.

The present invention is obviously not limited to the shown examples, rather it is also possible instead of the rectangular measuring rod to use a measuring rod with trapezoid profile, with rectangular profile or the like on which the sensing device is displaceably mounted. The profile can be, however, also rectangular or prismatic.

The possibility also exists to produce the U-shaped covering shaft for the measuring system equally to the rooflike sealing lips of bendable material, preferably synthetic material, whereby suitably in the covering shaft laminated members which are safe against bending are inserted as stiffening ribs.

Also the present invention is not limited to the fact that the covering shaft for the measuring system has a U-shaped profile, rather it is obviously also possible to design the covering shaft as a slotted tube or the like. Furthermore, it is also possible, deviating from the structure of FIG. 1, to secure the measuring rod directly at the inside of the U-shaped covering shaft by intermediate elastic elements, whereby then the covering shaft is mounted by means of securing elements, for instance, at the bed of a machine or the like.

While we have disclosed several embodiments of the present invention, it is to be understood that these embodiments are given by example only and not in a limiting sense.

We claim:

1. An arrangement for measuring of lengths comprising:
   a measuring system including a measuring rod and a sensing device,
   said measuring system being enclosed for protection against disturbing outer influences,
   a covering shaft receiving said sensing device,
   resilient sealing lips of bendable material projecting from said covering shaft over its entire length and covering as a roof member said covering shaft, and
   a driver projecting through said sealing lips and having a cross section of a sword favoring the adherence of said sealing lips.

2. The arrangement, as set forth in claim 1, wherein said sealing lips are made of synthetic material.

3. The arrangement, as set forth in claim 2, wherein said sealing lips are made of polyurethane.

4. The arrangement, as set forth in claim 1, wherein said sealing lips are made of rubber.

5. The arrangement, as set forth in claim 1, wherein said roof member comprises two pairs of superposed sealing lips, and said driver projects through both said pairs of sealing lips.

6. The arrangement, as set forth in claim 5, wherein said two pairs of said sealing lips define a chamber therebetween receiving pressurized air.

7. The arrangement, as set forth in claim 5, wherein one of said pairs of said sealing lips is made of metallic material.

8. The arrangement, as set forth in claim 7, wherein one of said pairs of sealing lips is made of resilient steel bands.

9. The arrangement, as set forth in claim 8, wherein said resilient bands are bent rooflike, and the face of said steel bands opposite said driver have a layer of synthetic material.

10. The arrangement, as set forth in claim 9, wherein said layer of synthetic material comprises teflon.

11. The arrangement, as set forth in claim 1, wherein said measuring rod is simultaneously a guide and supporting member for said sensing device, guide elements provided for said sensing device and clamped about said measuring rod, and said measuring rod is supported on its side remote from said sensing device by supporting legs on said covering shaft.

12. The arrangement, as set forth in claim 11, wherein said measuring rod has a plurality of supporting legs, and said guide elements surround said measuring rod to an extent that the passing of said supporting legs therethrough is made possible.

13. The arrangement, as set forth in claim 11, wherein said measuring rod has a prismatic cross section.

14. The arrangement, as set forth in claim 11, wherein said measuring rod has a rectangular cross section.

15. The arrangement, as set forth in claim 11, wherein said measuring rod has a trapezoid cross section.

16. The arrangement, as set forth in claim 11, wherein said supporting legs project sealingly through said covering shaft.

17. The arrangement, as set forth in claim 11, which includes a slide supporting said sensing device and including said guide elements, the latter constituting ball bearings.

18. The arrangement, as set forth in claim 11, wherein said covering shaft has an opening covered by said rooflike disposed sealing lips.

19. The arrangement, as set forth in claim 11, wherein said covering shaft is slightly displaceable relative to said measuring rod, and intermediate elastic elements inserted between said measuring system and its covering shaft.

20. The arrangement, as set forth in claim 19, wherein said supporting legs project sealingly through said covering shaft by means of said elastic elements.

21. The arrangement, as set forth in claim 1, wherein said covering shaft is made of bendable material.

22. The arrangement, as set forth in claim 1, wherein said covering shaft and said sealing lips are formed integrally of bendable material.